United States Patent

Tanaka

[11] Patent Number: 6,119,513
[45] Date of Patent: Sep. 19, 2000

[54] METHOD FOR ENDURANCE TESTING OF PNEUMATIC TIRES

[75] Inventor: Kenichi Tanaka, Kodaira, Japan

[73] Assignee: Bridgestone Corporation, Tokyo, Japan

[21] Appl. No.: 08/711,069

[22] Filed: Sep. 9, 1996

[30] Foreign Application Priority Data

Sep. 7, 1995 [JP] Japan .................................. 7-229989

[51] Int. Cl.$^7$ ................................................. G01M 17/02
[52] U.S. Cl. ................................................................ 73/146
[58] Field of Search ............................ 73/8, 146, 146.2, 73/146.3, 146.4, 146.5

[56] References Cited

U.S. PATENT DOCUMENTS

| | | | |
|---|---|---|---|
| 3,554,027 | 1/1971 | Sperberg | 73/146 |
| 3,877,496 | 4/1975 | Sperberg | 141/4 |
| 3,894,421 | 7/1975 | Sperberg | 73/146 |
| 4,969,493 | 11/1990 | Lee | 73/146 |
| 5,067,347 | 11/1991 | Mönch | 73/146 |

FOREIGN PATENT DOCUMENTS 0 574 171 A1  12/1993  European Pat. Off. .

OTHER PUBLICATIONS

Uchiyama, Yoshitaka, "The effect of Environment on the Friction and Wear of Rubber", *WEAR*, Aug. 1, 1986, pp. 369–378 (Japan Society of Lubrication Engineers' International Tribology Conference, Tokyo, Japan, Jul. 8–10, 1985, ISSN 0043–1648).

Okuda et al., "Study on Life Estimation of Cable Insulation by Gas Evolution and Oxygen Consumption during Radiation and Thermal Aging", Proceedings: Electrical Electronics Insulation Conference And Electrical Manufacturing & Coil Winding Conference, Rosemont, Ill, Oct. 4–7, 1993, pp. 703–706.

*Patent Abstracts of Japan*, vol. 17, No. 269 (P–154), May 25, 1993 (JP–5 010944 A).

*Primary Examiner*—George Dombroske
*Attorney, Agent, or Firm*—Sughrue, Mion, Zinn, Macpeak & Seas, PLLC

[57] ABSTRACT

A testing method for a tire, which enables reproduction of deterioration by aging under actual use and evaluation endurance after the deterioration by aging appropriately and effectively. The method includes a process to promote deterioration by oxygen, wherein a tire is inflated with concentrated oxygen having oxygen concentration x of not less than 30 which is indicated by the expression (I)

$$x = (PO/PT) \times 100 \; (\%)$$

where PT is the total pressure of inflated gas (kgf/cm$^2$) after completing inflation and PO is the partial pressure of oxygen (kgf/cm$^2$) with respect to the total pressure. After inflation of the tire with high concentrated oxygen, the tire is left for a given period and then actual endurance test of the tire is carried out, with the oxygen remaining in the tire or replaced with air.

11 Claims, No Drawings

METHOD FOR ENDURANCE TESTING OF PNEUMATIC TIRES

TECHNICAL FIELD OF THE INVENTION

This invention relates to a method of endurance testing of a pneumatic tire. In particular, it relates to a method of endurance testing a pneumatic tire wherein endurance evaluation after deterioration by aging can be appropriately made.

BACKGROUND OF THE INVENTION

Conventionally, endurance testing of a pneumatic tire is carried out, according to the standard JIS D4230, by inflating the tire with air to a regulated air pressure, leaving the tire at a temperature of 38±3° C. for three hours while maintaining a constant air pressure, and re-adjusting the air pressure as regulated and carrying out the endurance test. Further, JIS D4230-1978 discloses a testing method for humidity aged durability to investigate aging of a pneumatic steel radial tire for passenger under high-temperature and high-humidity, as a reference for measuring the steel cord separation problem, which typically arises during the summer. This method is carried out by leaving a tire without a rim under the condition of a temperature of 38° C. and a humidity of 95% for 20 days, and then carrying out a drum endurance test according to the high-speed endurance property test in JIS 4230.

The expected insured lifetime of a pneumatic tire is increasing recently as a result of increasing of reliability of the entire vehicle system, so it is inevitable to evaluate endurance after deterioration by aging. In the testing method for humidity aged durability described in JIS 4230-1978, however, the experimental condition such as leaving condition under high-temperature and high-humidity is not definitely set, and it has been found that some cases of failure cannot be reproduced in conventional in-house or out-house endurance tests when the tires suffer deterioration by actual use for a long time.

In this connection, the test method for a pneumatic radial tire has been expected to reproduce deterioration by aging after actual use, that is, to evaluate the endurance property after deterioration by aging appropriately and effectively.

SUMMARY OF INVENTION

According to the inventor's investigation, a rubber material in a pneumatic tire suffering deterioration by aging after actual use for a long time causes tire failure by losing original flexibility and tenacity. This relates considerably to deterioration of the rubber by oxygen in the air used to inflate the tire when the tire is mounted on a rim. Then, inventor had interest in the deterioration of rubber by oxygen and found out that the failure by deterioration by aging after actual use can be reproduced in a short period by using concentrated oxygen, and thus completed this invention.

In accordance with this invention a method for endurance testing of a pneumatic tire comprises a process to promote deterioration by oxygen, wherein the tire is inflated with a highly concentrated oxygen. The oxygen concentration x is indicated by following expression (I) is not less than 30%.

$$x = (PO/PT) \times 100 \ (\%) \qquad \text{expression (I)}$$

In the above expression, PT is the total pressure of inflated gas (kgf/cm$^2$) after completing inflation and PO is the partial pressure of oxygen (kgf/cm$^2$) with respect to the total pressure.

One preferred embodiment of the invention, the method for endurance test of a pneumatic tire includes the method as described in the above paragraph and further, the process to promote deterioration by oxygen includes: i) a step to inflate the tire with oxygen, ii) a step to leave or heat the tire, iii) a step to exhaust the oxygen, and further, the method comprises inflating the tire with air after the process to promote deterioration by oxygen and then carrying out an actual endurance testing process under load.

In another preferred embodiment of the invention, the method for endurance testing of a pneumatic tire comprises a process to promote deterioration by oxygen, wherein the tire is inflated with a highly concentrated oxygen. The oxygen concentration x is indicated by following expression (I) is not less than 30%.

$$x = (PO/PT) \times 100 \ (\%) \qquad \text{expression (I)}$$

In the above expression, PT is the total pressure of inflated gas (kgf/cm$^2$) after completing inflation and PO is the partial pressure of oxygen (kgf/cm$^2$) with respect to the total pressure. Further, the process to promote deterioration by oxygen includes: i) a step to inflate the tire with oxygen, ii) a step to leave or heat, and further, the method comprises carrying out an actual endurance testing process under load with the inflated oxygen remaining in the tire after the process to promote deterioration by oxygen.

In yet another embodiment of the invention, the method for endurance test of a pneumatic tire includes the method as described in the above paragraph and further, the oxygen concentration x indicated by the expression (I) in the process to promote deterioration by oxygen is from 30% to 60%.

In a further embodiment of the invention, the method for endurance test of pneumatic tire comprising a process to promote deterioration by oxygen which includes: i) a step to inflate the tire with high concentrated oxygen having an oxygen concentration x of not less than 30% wherein the oxygen concentration is indicated by the following expression (I), ii) a step to leave or heat the tire, and iii) a step to exhaust the oxygen, then the method further comprises a process to inflate the tire with air and carry out actual endurance testing under load, and then a process to exhaust the air from the tire, inflate the tire with concentrated oxygen again, leave or heat the tire, exhaust the oxygen, inflate the tire with air and carry out a second actual endurance testing under load.

$$x = (PO/PT) \times 100 \ (\%) \qquad \text{expression (I)}$$

In expression I, PT means the total pressure of inflated air (kgf/cm$^2$) after completing inflation and PO means partial pressure of oxygen (kgf/cm$^2$) with respect to the total pressure.

Further, In a method for endurance test of pneumatic tire described in the above preferred embodiments it is preferable for appropriately reproducing the deterioration by aging under actual use that a portion or the entirety of the process to promote deterioration by oxygen is carried out under within a temperature range of 20° C.–120° C., then the step of leaving or heating the tire in the process to promote deterioration by oxygen is carried out for at least 24 hours, or the process to promote deterioration by oxygen is carried out under the condition that 10–3000 cc of water is also charged in the tire.

In this invention, the actual endurance testing process under load is in general a drum endurance testing including, for example, a drum endurance test according to high-speed endurance property test regulated in JIS D4230, and a endurance test using an automobile.

DETAILED DESCRIPTION OF THE PREFERRED EMBODIMENTS

The method to carry out the endurance test using the tire inflated with high concentrated oxygen having oxygen concentration x of not less than 30, enables the reproduction of the transformation under actual use more precisely than the conventional method using a tire inflated with air. The adjustment method of the oxygen concentration as indicated in expression I, can adopt the conventional method. High oxygen concentration (or high partial pressure of oxygen) is preferable to promote deterioration in a short time, and thus, it is preferable that x=30%–99%, particularly X=30%–90% when considering the handling property. That is because, if x<30%, the promotion of deterioration is not sufficient. It is not preferable that x>99% because it is difficult to inject such a high-concentrated oxygen. Further, in case of the endurance test under a condition with a danger of burst due to heat generation of tire, it is preferable that x=30%–60%.

This process to promote deterioration by oxygen includes the steps of: i) inflating the tire with oxygen, ii) leaving or heating the tire, consequently in the process to carrying out the actual endurance test process under load, air can replace the oxygen the last step of iii) exhausting the oxygen, or allowing the high-concentrated oxygen to remain in the tire.

In this endurance test, hereinafter, the former case comprises a process to promote deterioration by oxygen (including inflating the tire with concentrated oxygen referred to as "oxygen" hereinafter—leaving or heating the tire—exhausting the oxygen)—inflation with air—a process to carry out the actual endurance test will be denoted as Test A. In the latter case, which comprises a process to promote deterioration by oxygen (including inflating the tire with oxygen—leaving or heating the tire)—a process to carry out the actual endurance test with the oxygen remaining in the tire will be named as a Test B. In this invention, each test method is adaptable. For example, in the case of testing a large size tire which has possibility of bursting due to heat generation during the actual endurance test, Test A is preferable. In the case where the possibility of bursting does not exist, Test B is preferable which can promote deterioration effectively.

In another preferred embodiment, the method for endurance testing of pneumatic tire can comprise the process to promote deterioration by oxygen which includes the steps of: i) inflating the tire with high concentrated oxygen, ii) leaving or heating the tire, and iii) exhausting the oxygen. The method further comprises a process to inflate the tire with air and carry out the actual endurance test under load, and then exhausting the air from the tire, inflating the tire with concentrated oxygen, again leaving the tire undisturbed or heating for a period of time, exhausting the oxygen, inflating the tire with air and carrying out a second actual endurance test under load.

This method, undergoing the first process to promote deterioration by oxygen (including inflating the tire with oxygen—leaving or heating the tire—exhaustion of oxygen)—inflation with air—the first actual endurance test—the second process to promote deterioration by oxygen (including inflation with oxygen—leaving or heating the tire—exhaustion of oxygen)—inflation with air—the second endurance test, will be called Test C.

Test C is preferable where it is needed to insure endurance in a second or more tire lifes such as in retread tires, wherein the test is used to judge whether it meets standards by repeating promotion of deterioration and provision of damage on actual running.

The process to promote deterioration by oxygen can be carried out at normal temperature (for example, at atmosphere temperature of about 20° C.)., and further, diffusion of oxygen into rubber composition of a tire can be accelerated by carrying out the method at a higher atmosphere temperature than normal temperature by heating. In this invention, the temperature is preferable to be about 20–120° C. If the atmosphere temperature is under 20° C., the promotion of deterioration is not sufficient and it takes significant time to obtain test results equivalent to that in actual conditions of use. On the other hand, if the temperature is over 120° C., there is possibility of tire bursting during the process to promote deterioration by oxygen.

When the test is carried out at a temperature higher than normal temperature by heating, the application of heating can be maintained during the entire process for deterioration of the tire by oxygen and the entire process of actual endurance test, or only during the entire process to promote deterioration of the tire. Further, heating can be carried out only during process ii) to leave or heat the tire inflated with high-concentrated oxygen (out of the process to promote deterioration of the tire).

The heating method can be a method to raise the atmospheric temperature of the test process by heater, or a method that utilizes self heating by tire rotation during the endurance test. In the method that utilizes self heating, it is preferable to combine this heating with other temperature control apparatus to control the temperature condition, thereby achieving a stable test. In the process to promote deterioration that uses high concentrated oxygen, it is preferable to use as a heater, for example, a steam oven because of safety.

In order to diffuse oxygen sufficiently into the rubber composition of the tire, it is preferable to continue this process to promote deterioration of the tire for at least one day, that is, for not less than 24 hours.

Generally, the oxygen used in the process to promote deterioration of the tire does not include moisture, so the amount of moisture in the high concentrated oxygen used in the tire is less than that found in air. Therefore, the influence of moisture to deterioration, for example, the deterioration of steel cords used in rubber products or carcass plies of the tire by moisture, is reduced, so that deterioration by aging occurring in actual use cannot be reproduced effectively in a short period. Accordingly, it is preferable to introduce water, more than in air, into the tire. The amount of the water is preferably about 10–3000 cc per one tire. If the amount of the water is less than 10 cc, it is difficult to obtain stable test results, and, if it is more than 3000 cc, the water will easily leak out of the tire during mounting the tire on a rim. The addition of an appropriate amount of water promotes corrosion of steel cords and so on, and transformation of aging can be effectively reproduced.

EXAMPLE

The test method according to the invention will be explained in detail with examples, however, this invention is not limited by these examples.

Test tire

As a test tire, a passenger steel radial tire with a size of 185SR14 (which is named PSR) and a truck-bus steel radial tire with a size of 12R22.5 (denoted TBR) were prepared.

Process to promote deterioration

The regulated maximum air pressure PM (kgf/cm$^2$) of each tire is indicated in Table 1. Test tire was mounted on a rim and inflated with gas and adjusted so as to be in a condition of pressure PT (kgf/cm$^2$) and oxygen concentration x (%) described in Table 1, and then the tire with a rim was placed in a constant temperature room. The condition of the test is shown in Table 1, wherein t (° C.) is a temperature of the constant temperature room in which the tire with a rim was placed and L (days) is a period for which the tire remained in the constant temperature room.

Process of actual endurance test

Table 1 also shows the selection of the actual endurance test between (A) process to promote deterioration by oxygen—exhaustion of oxygen—inflation of air—process of actual endurance test, (B) process to promote deterioration by oxygen—process to carrying out the actual endurance test with the oxygen remaining in the tire, or (C) process to promote deterioration by oxygen—exhaustion of oxygen—inflation of air—the first actual endurance test—exhaustion of air—the second process to promote deterioration by oxygen (including inflation of oxygen—leaving or heating the tire—exhaustion of oxygen)—inflating with air—the second actual endurance test. The result of the test is shown in Table 1 by index, based on the drum test life of the following Comparative Example 1 as a control having index of 100 in Example 1–5 and Comparative Example 1–2, and based on the drum test life of the following Comparative Example 3 as a control having index of 100 in Example 6–9 and Comparative Example 3–4.

Comparative evaluation with actual use

Internal deterioration condition of a PSR and a TBR used for 2–4 years in normal condition (running at a average speed of about 40 km/hr for 1–6 hours per day) was evaluated in terms of decreasing of elastomer modules of rubber, occurring condition of cracks and deterioration condition of steel cords. The result of these actually used tires were compared with the examples and comparative examples by five expert panelists. The result is shown in Table 1 according to the following standard:

○: very similar to the actual used tire

Δ: a little different from the actually used tire x: completely different from the actually used tire

Example 1

The regulated maximum air pressure of a PSR tire is 2.4(kgf/cm$^2$). The PSR tire was inflated with high concentrated oxygen so that the total gas pressure after inflation was 2.4 (kgf/cm$^2$) and x=40, and the tire was left in a constant temperature room at 60° C. for 14 days. Then, the pressure was readjusted with high concentrated oxygen remaining in the tire and an actual endurance test of the tire was carried out by in-house drum endurance test under a condition of a load that is the regulated maximum load x 1.2 and a drum running speed is 90km/hr.

Comparative Example 1

The regulated maximum air pressure of a PSR tire is 2.4(kgf/cm$^2$). Without the process to promote deterioration by high concentrated oxygen, the PSR tire with air remaining inside was tested in the same condition as in the actual endurance test of Example 1.

Comparative Example 2

The regulated maximum air pressure of a PSR tire is 2 4(kgf/cm$^2$). Instead of high concentrated oxygen, the PSR tire was inflated with air (having oxygen concentration of x=21) and the tire was left in a constant temperature room at 60° C for 14 days, then the actual endurance test was carried out in the same condition, as in Example 1.

Example 2

Except for the total gas pressure of a PSR after inflation was set to be 4.8 (kgf/cm$^2$), the process to promote deterioration and the actual endurance test was carried out in the same condition as in Example 1.

Example 3

Except that a PSR tire was inflated with high concentration oxygen to be x=76, the process to promote deterioration and the endurance test was carried out in the same condition, as in Example 1.

Example 4

Except that a temperature of a constant temperature room in which a PSR tire was left was 40° C., the process to promote deterioration and the actual endurance test was carried out in the same condition, as in Example 3.

Example 5

Except that a temperature of a constant temperature room in which a PSR tire was left was 20° C, the process to promote deterioration and the actual endurance test was carried out in the same condition, as in Example 1.

Example 6

The regulated maximum air pressure of a PSR tire is 8.0(kgf/cm$^2$). The TBR tire was inflated with high concentrated oxygen so that the total gas pressure after inflation was 8.0 (kgf/cm$^2$) and x=80, and the tire was left in a constant temperature room at 80° C. for 3 days. Then, oxygen was exhausted from the tire and the tire was inflated with air. The actual endurance test was carried out in the same condition, as in Example 1.

Comparative Example 3

The air pressure of a TBR tire was set to 8.0 (kgf/cm$^2$) and the actual endurance test was carried out in the same condition in Comparative Example 1 without the process to promote deterioration by high concentrated oxygen.

Comparative Example 4

Instead of concentrated oxygen, a TBR tire was inflated with air (having oxygen concentration of x=21) and the tire was left in a constant temperature room at 80° C. for 12 hours (0.5 day), then the actual endurance test was carried out in the same condition as in Example 6.

Example 7

Except that a period for which a TBR tire was left in a constant temperature room was 14 days, the process to promote deterioration and the actual endurance test was carried out in the same condition, as in Example 6.

Example 8

Except that 300 cc of water was charged with gas in a TBR tire during mounting the tire on a rim and a period for which a TBR tire was left in a constant temperature room was 14 days, the process to promote deterioration and the actual endurance test was carried out in the same condition, as in Example 7.

Example 9

The process to promote deterioration of a TBR tire was carried out in the same condition, as in Example 6. Then, oxygen was exhausted and the tire was inflated with air. The first actual endurance test was carried out in the same condition, as in Example 6, for a running time of 30% of that in Comparative Example 3. Then, air was exhausted and the tire was inflated with high concentrated oxygen as in the same condition in the process to promote deterioration and the second actual endurance test was carried out in the same condition, as in Example 6, with the oxygen in the tire. The result of the drum test life of the second actual endurance test is indicated in Table 1.

TABLE 1

| Examples | Tire | Regulated maximum air pressure PM [kgf/cm²] | Inflated gas pressure PT [kgf/cm²] | Process to promote deterioration by high concentration oxygen | | | Endurance test process | Drum test life | Difference between Examples and actual use | | |
|---|---|---|---|---|---|---|---|---|---|---|---|
| | | | | Oxygen concentration x [%] | Thermostat room temperature t [° C.] | Period of leaving L [days] | | | Deterioration of rubber | Cracks | Cords |
| Example 1 | PSR | 2.4 | 2.4 | 40 | 60 | 14 | B | 45 | ○ | △ | △ |
| Example 2 | " | " | 4.8 | " | " | " | B | 25 | ○ | ○ | △ |
| Example 3 | " | " | 2.4 | 76 | " | " | B | 20 | ○ | ○ | △ |
| Example 4 | " | " | " | " | 40 | " | B | 50 | ○ | △ | △ |
| Example 5 | " | " | " | " | 20 | " | B | 85 | △ | △ | △ |
| Comparative Example 1 | " | " | 2.4 | — | — | — | (air) | 100 | x | x | x |
| Comparative Example 2 | " | " | " | 21 | 60 | 14 | (air) | 90 | △ | x | x |
| Example 6 | TBR | 8.0 | 8.0 | 91 | 80 | 3 | A | 65 | ○ | △ | △ |
| Example 7 | " | " | " | " | " | 14 | A | 30 | ○ | △ | △ |
| Example 8 | " | " | " | " | " | 14 | A* | 15 | ○ | ○ | ○ |
| Comparative Example 3 | " | " | 80 | — | — | — | (air) | 100 | x | x | x |
| Comparative Example 4 | " | " | " | 21 | 80 | 0.5 | (air) | 100 | x | x | x |
| Example 9 | " | " | " | 91 | 80 | 3 | C | 10 | ○ | ○ | △ |

*In Example 8, 300 cc of water was injected in the tire

A tendency was found that a tire suffering a crack occurring condition similar to that in actually used tire has a short life in a drum test.

That is, it was found out that the test method of Examples 1–9, including the process to promote deterioration of the tire by oxygen according to this invention, leads to a condition very similar to a condition of actual use of a tire in a short time period. In particular, in Example 8, where water was charged into the tire, the deterioration condition of tire cords was also very similar to that in the actually used tire, as well as rubber composition of the tire. On the other hand, the condition of each comparative example without the process to promote deterioration by concentrated oxygen was largely different from that in the actually used tire and did not appropriately reproduce the deterioration by aging of actual use. Hence, it was confirmed that by them appropriate endurance evaluation cannot be carried out.

According to the method of this invention for an endurance test of pneumatic tires, deterioration by aging by actual use can be reproduced, that is, endurance property after deterioration by aging can be appropriately and effectively evaluated.

What is claimed is:

1. A method for endurance testing a pneumatic tire comprising the steps of: promoting deterioration by oxygen by inflating the tire with concentrated oxygen, the oxygen concentration x as indicated by expression (I) being not less than 30%, wherein $$x = (PO/PT) \times 100 \ (\%) \qquad \text{expression (I)}$$

wherein, PT is the total pressure of inflated gas (kgf/cm²) after completing inflation and PO is the partial pressure of oxygen (kgf/cm²) with respect to the total pressure; subsequently inflating said tire with air and carring out an endurance test.

2. A method for endurance test of a pneumatic tire as claimed in claim 1, wherein at least a portion of the process to promote deterioration by oxygen is carried out under a temperature range in the range of 20° C.–120° C.

3. A method for endurance test of a pneumatic tire as claimed in claim 1, wherein the process to promote deterioration by oxygen is carried out under the condition that 10–3000 cc of water is charged in the tire.

4. The method as claimed in claim 1, wherein the process to promote deterioration by oxygen which futher includes the steps of: leaving the tire undisturbed for a period of time after inflation with oxygen; exhausting the oxygen, and then inflating the tire with air after the process to promote deterioration by oxygen has been completed and said endurance test is an actual endurance test under load.

5. A method for endurance test of a pneumatic tire as claimed in claim 4, wherein the step of leaving the tire undisturbed to promote deterioration by oxygen is carried out for at least 24 hours.

6. The method as claimed in claim 1, wherein the process to promote deterioration by oxygen which further includes the steps of: heating said tire after inflation with oxygen, exhausting the oxygen, and then inflating the tire with air after the process to promote deterioration by oxygen is completed and said endurance test is conducted under load.

7. A method for endurance test of a pneumatic tire as claimed in claim 6, wherein the step of leaving the tire undisturbed to promote deterioration by oxygen is carried out for at least 24 hours.

8. A method for endurance testing of a pneumatic tire comprising the steps of: promoting deterioration by oxygen by inflating the tire with concentrated oxygen having a oxygen concentration x of not less than 30% wherein the oxygen concentration is indicated by expression (I), $$x = (PO/PT) \times 100 \ (\%) \qquad \text{expression (I)}$$

in which, PT is the total pressure of inflated air (kgf/cm²) after completing inflation and PO is the partial pressure of oxygen (kgf/cm²) with respect to the total pressure;

retaining the oxygen inside the tire for a period of time;

exhausting the oxygen;

inflating tire with air;

carrying out an actual endurance test under load, then exhausting the air from the tire;

inflating the tire with concentrated oxygen a second time; retaining the oxygen inside the tire for a period of time; exhausting the oxygen; inflating the tire with air; and carrying out a second actual endurance test under load.

9. A method for endurance test of a pneumatic tire as claimed in claim 8, wherein the tire is heated for at least a portion of the time oxygen is retained in the tire following first inflation with oxygen.

10. A method for endurance test of a pneumatic tire as claimed in claim 8, wherein the tire is heated for at least a portion of the time oxygen is retained in the tire following second inflation with oxygen.

11. A method for endurance testing of a pneumatic tire comprising the steps of: promoting deterioration by oxygen by inflating the tire with concentrated oxygen having a oxygen concentration x of not less than 30% wherein the oxygen concentration is indicated by expression (I), $$x = (PO/PT) \times 100 \ (\%) \qquad \text{expression (I)}$$

in which, PT is the total pressure of inflated air (kgf/cm$^2$) after completing inflation and PO is the partial pressure of oxygen (kgf/cm$^2$) with respect to the total pressure;

heating the tire;

exhausting the oxygen;

inflating tire with air;

carrying out an actual endurance test under load, then exhausting the air from the tire;

inflating the tire with concentrated oxygen a second time; heating the tire; exhausting the oxygen; inflating the tire with air; and carrying out a second actual endurance test under load.

* * * * *